US012561263B2

(12) United States Patent
Saeki et al.

(10) Patent No.: US 12,561,263 B2
(45) Date of Patent: Feb. 24, 2026

(54) I/O UNIT

(71) Applicant: FANUC CORPORATION, Yamanashi (JP)

(72) Inventors: Masahiro Saeki, Yamanashi-ken (JP); Shinichi Kuwahata, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 18/283,644

(22) PCT Filed: Mar. 11, 2022

(86) PCT No.: PCT/JP2022/010773

§ 371 (c)(1),
(2) Date: Sep. 22, 2023

(87) PCT Pub. No.: WO2022/202386

PCT Pub. Date: Sep. 29, 2022

(65) Prior Publication Data

US 2024/0168899 A1 May 23, 2024

(30) Foreign Application Priority Data

Mar. 24, 2021 (JP) ................................. 2021-049366

(51) Int. Cl.
*G06F 13/362* (2006.01)
(52) U.S. Cl.
CPC .................................. *G06F 13/362* (2013.01)
(58) Field of Classification Search
CPC ................................. G06F 1/26; H02J 7/0048

USPC .......................................................... 710/110
See application file for complete search history.

(56) References Cited

U.S. PATENT DOCUMENTS

| | | | | |
|---|---|---|---|---|
| 4,523,273 | A * | 6/1985 | Adams, III | ......... G06F 11/2002 |
| | | | | 714/E11.011 |
| 6,680,904 | B1 * | 1/2004 | Kaplan | .................... H04L 12/56 |
| | | | | 370/465 |
| 7,318,750 | B1 * | 1/2008 | Chacon | .................. H01R 33/90 |
| | | | | 200/51.03 |
| 9,230,691 | B1 * | 1/2016 | Boynapalli | .......... G11C 29/765 |
| 9,934,181 | B2 * | 4/2018 | Harriman | ............ G06F 13/4295 |

(Continued)

FOREIGN PATENT DOCUMENTS

| | | |
|---|---|---|
| CN | 104570944 A | 4/2015 |
| CN | 109884960 A | 6/2019 |

(Continued)

OTHER PUBLICATIONS

International Search Report of PCT/JP2022/010773 dated May 17, 2022 [PCT/ISA/210].

*Primary Examiner* — Paul R. Myers
(74) *Attorney, Agent, or Firm* — Sughrue Mion, PLLC

(57) ABSTRACT

An I/O unit comprises: two front-stage terminals; a slave processing circuit; two rear-stage terminals; and a selection circuit for selecting whether to connect the front-stage terminal and the rear-stage terminal, and the front-stage terminal and the rear-stage terminal, or to connect the front-stage terminal and the rear-stage terminal, and the front-stage terminal and the rear-stage terminal. The selection circuit connects to the rear-stage terminal via the slave processing circuit.

1 Claim, 4 Drawing Sheets

LEGEND:
12: Master Unit
14: I/O (slave) unit
22, 22a, 22b: Connector
24, 24a, 24b: Master processing circuit
26, 26a, 26b: Branch line
30, 30a, 30b, 32, 32a, 32b: Terminals
34: Slave processing circuit
36: Interface
38: Selection circuit
Cont: Control device
Ins: Device

(56)　　　　　References Cited

U.S. PATENT DOCUMENTS

| 2002/0149960 | A1* | 10/2002 | Yoo ........................ G11C 7/106 |
| | | | 365/189.02 |
| 2004/0098532 | A1* | 5/2004 | Huang ................... G06F 3/023 |
| | | | 710/316 |
| 2004/0203511 | A1* | 10/2004 | Hsu ......................... H04B 1/38 |
| | | | 455/90.3 |
| 2006/0155902 | A1* | 7/2006 | Kamegawa ......... G06F 13/4022 |
| | | | 710/110 |
| 2006/0240861 | A1* | 10/2006 | Wang ................. H04M 1/2535 |
| | | | 379/433.1 |
| 2006/0250947 | A1* | 11/2006 | Allen ................... H04L 12/437 |
| | | | 370/216 |
| 2007/0083619 | A1* | 4/2007 | Chen ................... H01R 31/005 |
| | | | 709/218 |
| 2007/0174530 | A1* | 7/2007 | Genova .............. G06F 13/4031 |
| | | | 710/240 |
| 2009/0164675 | A1* | 6/2009 | Chen ........................ G06F 3/023 |
| | | | 710/64 |
| 2010/0183004 | A1* | 7/2010 | Kobayashi ........... G06F 13/385 |
| | | | 370/389 |
| 2011/0153889 | A1* | 6/2011 | Barrenscheen ....... H04L 12/403 |
| | | | 710/110 |
| 2011/0173358 | A1* | 7/2011 | Ohmacht ........... G06F 13/4022 |
| | | | 710/110 |
| 2011/0231027 | A1* | 9/2011 | Lee ........................ G05B 15/02 |
| | | | 700/291 |
| 2012/0057467 | A1* | 3/2012 | Yoshida ................ H04L 49/505 |
| | | | 370/238 |
| 2013/0013831 | A1* | 1/2013 | Ueno ................. G06F 15/7807 |
| | | | 710/110 |
| 2013/0132633 | A1* | 5/2013 | Kim Yeung ............ G06F 13/36 |
| | | | 710/306 |
| 2013/0159593 | A1* | 6/2013 | Yeung ................. G06F 13/4022 |
| | | | 710/316 |
| 2013/0173832 | A1* | 7/2013 | Calvin ...................... H01F 3/14 |
| | | | 710/110 |
| 2013/0297829 | A1 | 11/2013 | Berenbaum et al. |
| 2014/0032802 | A1* | 1/2014 | Sip ........................ G06F 13/364 |
| | | | 710/110 |
| 2014/0047132 | A1* | 2/2014 | Sip ........................... G06F 3/00 |
| | | | 710/110 |
| 2014/0047145 | A1* | 2/2014 | Sip ........................ G06F 13/385 |
| | | | 710/313 |
| 2015/0161074 | A1* | 6/2015 | Beeson ................. G06F 13/426 |
| | | | 710/110 |
| 2017/0132165 | A1* | 5/2017 | Uekuri ............... G06F 13/4282 |
| 2018/0287491 | A1* | 10/2018 | Muto ...................... G06F 1/266 |
| 2019/0171608 | A1* | 6/2019 | Kunz ................. G06F 13/4282 |
| 2019/0243793 | A1 | 8/2019 | Karb et al. |
| 2020/0235815 | A1* | 7/2020 | Rolston .................. H04L 12/50 |
| 2020/0333758 | A1 | 10/2020 | Kretschmann |

FOREIGN PATENT DOCUMENTS

| JP | 9-244772 A | 9/1997 |
| JP | 9-247766 A | 9/1997 |
| JP | 2002-091519 A | 3/2002 |
| JP | 2011-130307 A | 6/2011 |
| JP | 2016-110460 A | 6/2016 |
| JP | 2018-157456 A | 10/2018 |
| JP | 2019-114085 A | 7/2019 |
| JP | 2021-002172 A | 1/2021 |

* cited by examiner

LEGEND:
12: Master Unit
14: I/O (slave) unit
22, 22a, 22b:  Connector
24, 24a, 24b:  Master processing circuit
26, 26a, 26b:  Branch line
30, 30a, 30b, 32, 32a, 32b:  Terminals
34:  Slave processing circuit
36:  Interface
38:  Selection circuit
Cont: Control device
Ins: Device LEGEND:
12: Master Unit
14: I/O (slave) unit
22, 22a, 22b: Connector
24, 24a, 24b: Master Processing Circuit
26, 26a, 26b: Branch line
30, 30a, 30b, 32, 32a, 32b: Terminals
34: Slave processing circuit
36: Interface
38: Selection circuit
Cont: Control device
Ins: Device LEGEND
12: Master unit
14: I/O (slave) unit
22 22a, 22b: Connector
24.: Master
26, 26a, 26b: Branch line
30, 30a, 30b, 32, 32a, 32b: Terminals
24: Slave processing ucircuit
36: Interface
38: Selection ciurcuit
COnt: Control device
Ins: Device LEGEND
100: Coupler
102: Master processing circuit
104: I/O unit
106: Slave processing circuit
Ins: Device

I/O UNIT

CROSS REFERENCE TO RELATED APPLICATIONS

This application is a National Stage of International Application No. PCT/JP2022/010773 filed on Mar. 11, 2022, claiming priority based on Japanese Patent Application No. 2021-049366 filed on Mar. 24, 2021, which are incorporated herein by reference.

TECHNICAL FIELD

The present invention relates to an I/O unit for connecting a master unit and a device and performing signal transmission between the master unit and the device.

BACKGROUND ART

JP 2016-110460 A discloses a programmable logic controller system. The programmable logic controller system includes a base unit (master) and a plurality of expansion units (slaves). The base unit and the plurality of expansion units are daisy-chain connected together, with the master unit being at the head. Each of the plurality of expansion units is, for example, an I/O unit. The base unit transmits and receives signals to and from a controlled device via the plurality of expansion units. The controlled device is, for example, a sensor or an actuator.

SUMMARY OF THE INVENTION

The master unit and the plurality of I/O units are arranged along a predetermined installation direction with the master unit at the head. In this case, the terminal of the master unit and the terminal of the I/O unit next to each other are connected to each other. The terminals of the adjacent I/O units are connected to each other. With this configuration, the master processing circuit of the master unit and the slave processing circuits of the plurality of I/O units are connected in a daisy chain without separately providing a cable or the like.

Here, there is a demand for providing a plurality of master processing circuits in the master unit. However, when the master unit and the I/O unit are arranged in the above-described arrangement order, only one I/O unit is next to the master unit. Therefore, even if the master unit includes a plurality of master processing circuits, only one master processing circuit can be connected to the slave processing circuit. Master processing circuits other than the one master processing circuit are not connected to slave processing circuits. In other words, the plurality of slave processing circuits cannot be connected to each of the plurality of master processing circuits.

The present invention has the object of solving the aforementioned problems.

According to an aspect of the present invention, there is provided an I/O unit that connects a master unit and a device and transmits a signal between the master unit and the device, the I/O unit including: a first preceding-stage terminal and a second preceding-stage terminal configured to be connected to the master unit or another I/O unit provided in a preceding stage of the I/O unit; a first subsequent-stage terminal and a second subsequent-stage terminal configured to be connected to another I/O unit provided in a subsequent stage of the I/O unit; a selection circuit configured to select between a connection state in which the first preceding-stage terminal is connected to the first subsequent-stage terminal and the second preceding-stage terminal is connected to the second subsequent-stage terminal and a connection state in which the first preceding-stage terminal is connected to the second subsequent-stage terminal and the second preceding-stage terminal is connected to the first subsequent-stage terminal; and a slave processing circuit configured to perform input and output of a signal with respect to a master processing circuit of the master unit, wherein one of the first preceding-stage terminal or the second preceding-stage terminal or one of the first subsequent-stage terminal or the second subsequent-stage terminal is connected to the selection circuit via the slave processing circuit.

According to an aspect of the present invention, it is possible to provide an I/O unit that enables a plurality of slave processing circuits to be connected to each of a plurality of master processing circuits even when the master unit includes the plurality of master processing circuits.

DETAILED DESCRIPTION OF THE INVENTION

An I/O unit (input/output unit) according to the present invention will be detailed below by describing a preferred embodiment with reference to the accompanying drawings.

Embodiments

Figure 1:
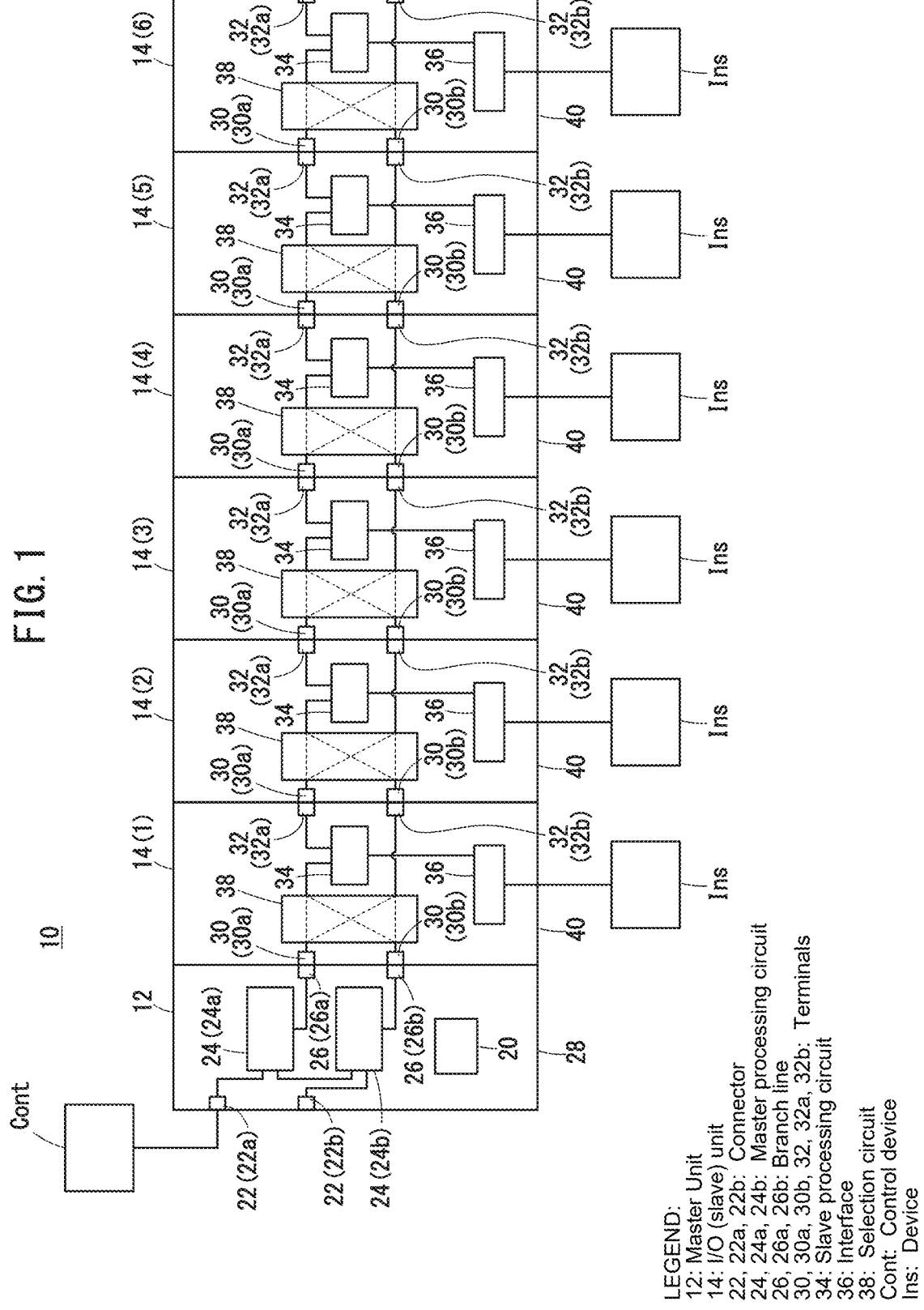
FIG. 1 is a diagram illustrating a configuration of a communication system according to an embodiment.

FIG. 1 is a diagram illustrating a configuration of a communication system 10. The communication system 10 transmits signals between the control device Cont and the devices Ins. Each of the devices Ins includes, for example, an actuator and a sensor. The actuator includes, for example, a switch. The sensor detects, for example, pressure, voltage, current, ambient temperature, or humidity.

The communication system 10 includes a communication coupler unit (master unit) 12 and a plurality of I/O units (slave units) 14. The plurality of I/O units 14 are sequentially connected to the subsequent stage of the communication coupler unit 12. The communication coupler unit 12 and the plurality of I/O units 14 connected to the subsequent stage constitute one station. The communication coupler unit 12 of the communication system 10 is connected to the control device Cont. The plurality of I/O units 14 are connected to the plurality of devices Ins. In the example of FIG. 1, one device Ins is connected to each of the I/O units 14. However, a plurality of devices Ins may be connected to each of the I/O units 14. Six I/O units 14 are connected to the communication coupler unit 12 shown in FIG. 1. However, the number of I/O units 14 connected to the communication coupler unit 12 is not limited to six.

Note that suffixes (1), (2), . . . , (6) corresponding to the number of stages from the communication coupler unit 12 are added after the reference numeral (14) of the I/O unit in FIG. 1. These suffixes are used in the following description when a particular I/O unit 14 is referred to.

The communication coupler unit 12 includes a power supply 20, two connectors 22 (22a and 22b), two master processing circuits 24 (24a and 24b), two branch-line terminals 26 (26a and 26b), and a housing 28. The housing 28 houses the power supply 20, the two connectors 22, the two master processing circuits 24, and the two branch-line terminals 26. At least parts of the two connectors 22 (22a and 22b) and the two branch-line terminals 26 (26a and 26b) are exposed from the housing 28. Therefore, the two connectors 22 (22a and 22b) and the two branch-line terminals 26 (26a and 26b) can be connected to connection members (cables or other terminals) outside the communication coupler unit 12.

The power supply 20 supplies electric power to the two master processing circuits 24 (24a, 24b). The power supply 20 may supply electric power to the I/O units 14. In this case, the power supply 20 may supply power to slave processing circuits 34 and interfaces 36 described below.

The two connectors 22 (22a and 22b) are connectors connected to the control device Cont or another communication coupler unit 12. The connector 22a is connected to the control device Cont provided in the preceding stage or another communication coupler unit 12 provided in the preceding stage. The connector 22b is connected to a connector 22a of another communication coupler unit 12 provided at the subsequent stage. The two connectors 22 (22a and 22b) are connected to the control device Cont or another communication coupler unit 12 via cables.

The connector 22a is connected to the master processing circuit 24a. The connector 22b is connected to the master processing circuit 24b. The master processing circuit 24a and the master processing circuit 24b are connected to each other. Therefore, the master processing circuit 24a and the master processing circuit 24b are daisy-chain connected to the control device Cont in this order. The connector 22b of the communication coupler unit 12 is connectable to the connector 22a of another communication coupler unit 12. Accordingly, in a case of a plurality of the communication coupler units 12 each including the two master processing circuits 24 (24a and 24b), the master processing circuits can be daisy-chain connected to the control device Cont. A signal line path in which the plurality of master processing circuits 24 (24a and 24b) are daisy-chain connected to the control device Cont is referred to as a main line path.

The two master processing circuits 24 (24a and 24b) are communication circuits for performing input and output of signals with respect to the I/O unit 14 (slave processing circuit 34). The master processing circuit 24 and the slave processing circuit 34 described below may include a central processing unit (CPU), an application specific integrated circuit (ASIC), a programmable logic device (PLD), a field programmable logic gate array (FPGA), or the like.

The two branch-line terminals 26 (26a and 26b) are terminals to be connected to the I/O unit 14 disposed at the subsequent stage next to the communication coupler unit 12. The branch-line terminal 26a is connected to the master processing circuit 24a. The branch-line terminal 26b is connected to the master processing circuit 24b.

The I/O unit 14 includes two preceding-stage terminals 30 (30a and 30b), two subsequent-stage terminals 32 (32a and 32b), a slave processing circuit 34, an interface 36, a selection circuit 38, and a housing 40. The housing 40 houses the two preceding-stage terminals 30, the two subsequent-stage terminals 32, the slave processing circuit 34, the interface 36, and the selection circuit 38. At least parts of the two preceding-stage terminals 30, the two subsequent-stage terminals 32, and the interface 36 are exposed from the housing 40. Therefore, at least parts of the two preceding-stage terminals 30, the two subsequent-stage terminals 32, and the interface 36 can be connected to connection members (a cable, another terminal, or the like) outside the I/O unit 14.

The two preceding-stage terminals 30 (30a and 30b) are terminals to be connected to the communication coupler unit 12 or another I/O unit 14 provided at the preceding stage next to the I/O unit 14. The two subsequent-stage terminals 32 (32a and 32b) are terminals to be connected to another I/O unit 14 provided at the subsequent stage adjacent to the I/O unit 14.

When the communication coupler unit 12 is provided in the preceding stage, the preceding-stage terminal 30a (first preceding-stage terminal) is connected to the branch-line terminal 26a of the communication coupler unit 12 provided in the preceding stage. In this case, the preceding-stage terminal 30b (second preceding-stage terminal) is connected to the branch-line terminal 26b of the communication coupler unit 12 provided at the preceding stage. When the I/O unit 14 is provided in the preceding stage, the preceding-stage terminal 30a is connected to the subsequent-stage terminal (first subsequent-stage terminal) 32a of the I/O unit 14 provided in the preceding stage. In this case, the preceding-stage terminal 30b is connected to the subsequent-stage terminal (second subsequent-stage terminal) 32b of the I/O unit 14 provided at the preceding stage.

The slave processing circuit 34 is a communication circuit for performing input and output of signals with respect to one of the two master processing circuits 24 (24a and 24b). The interface 36 is hardware (a circuit or an electronic component group) for connecting the slave processing circuit 34 and the device Ins and transmitting a signal between the slave processing circuit 34 and the device Ins. The specific configuration of the interface 36 varies depending on the type of the device Ins.

The selection circuit 38 connects the two preceding-stage terminals 30 (30a, 30b) and the two subsequent-stage terminals 32 (32a, 32b). The subsequent-stage terminal 32a is connected to the selection circuit 38 via the slave processing circuit 34. The subsequent-stage terminal 32b is connected to the selection circuit 38 without going through the slave processing circuit 34.

The selection circuit 38 can switch the connection relationship between the two preceding-stage terminals 30 (30a and 30b) and the two subsequent-stage terminals 32 (32a and 32b), between a first connection relationship and a second connection relationship. The first connection relationship is a connection relationship in which the preceding-stage terminal 30a and the subsequent-stage terminal 32a are connected via the slave processing circuit 34, and the preceding-stage terminal 30b and the subsequent-stage terminal 32b are connected not via the slave processing circuit 34. The second connection relationship is a connection relationship in which the preceding-stage terminal 30b and the subsequent-stage terminal 32a are connected via the slave processing circuit 34, and the preceding-stage terminal 30a and the subsequent-stage terminal 32b are connected not via the slave processing circuit 34.

The selection circuit 38 switches the connection relationship between the two preceding-stage terminals 30 (30a, 30b) and the two subsequent-stage terminals 32 (32a, 32b), between the first connection relationship and the second connection relationship in response to an operation by the operator. For example, the selection circuit 38 may include a switch (not illustrated). The switch may switch between the first connection relationship and the second connection relationship in response to an operator's operation of a switching element.

The I/O unit 14 of FIG. 1 has the following advantageous effects.

That is, the I/O unit 14 includes two preceding-stage terminals 30 (30*a* and 30*b*) and two subsequent-stage terminals 32 (32*a* and 32*b*). One of the two preceding-stage terminals 30 (30*a*, 30*b*) and one of the two subsequent-stage terminals 32 (32*a*, 32*b*) are connected to each other via the slave processing circuit 34. The remaining preceding-stage terminal 30 and the remaining subsequent-stage terminal 32 are connected to each other not via the slave processing circuit 34. Thus, the I/O unit 14 allows a plurality of slave processing circuits 34 to be connected to each of the two master processing circuits 24 (24*a*, 24*b*). A signal line path in which the plurality of slave processing circuits 34 are daisy-chain connected to the master processing circuit 24*a* is referred to as a first branch path in the following description. A signal line path in which the plurality of slave processing circuits 34 are daisy-chain connected to the master processing circuit 24*b* is referred to as a second branch path in the following description.

The I/O unit 14 also includes the selection circuit 38. As a result, an I/O unit whose slave processing circuit 34 is connected to the master processing circuit 24*a* and an I/O unit whose slave processing circuit 34 is connected to the master processing circuit 24*b* are unified as one I/O unit 14. Therefore, the operator does not need to separately prepare a dedicated I/O unit for the master processing circuit 24*a*, i.e., in which its slave processing circuit 34 is connected to the master processing circuit 24*a*, and a dedicated I/O unit for the master processing circuit 24*b*, i.e., in which its slave processing circuit 34 is connected to the master processing circuit 24*b*.

Figure 2:
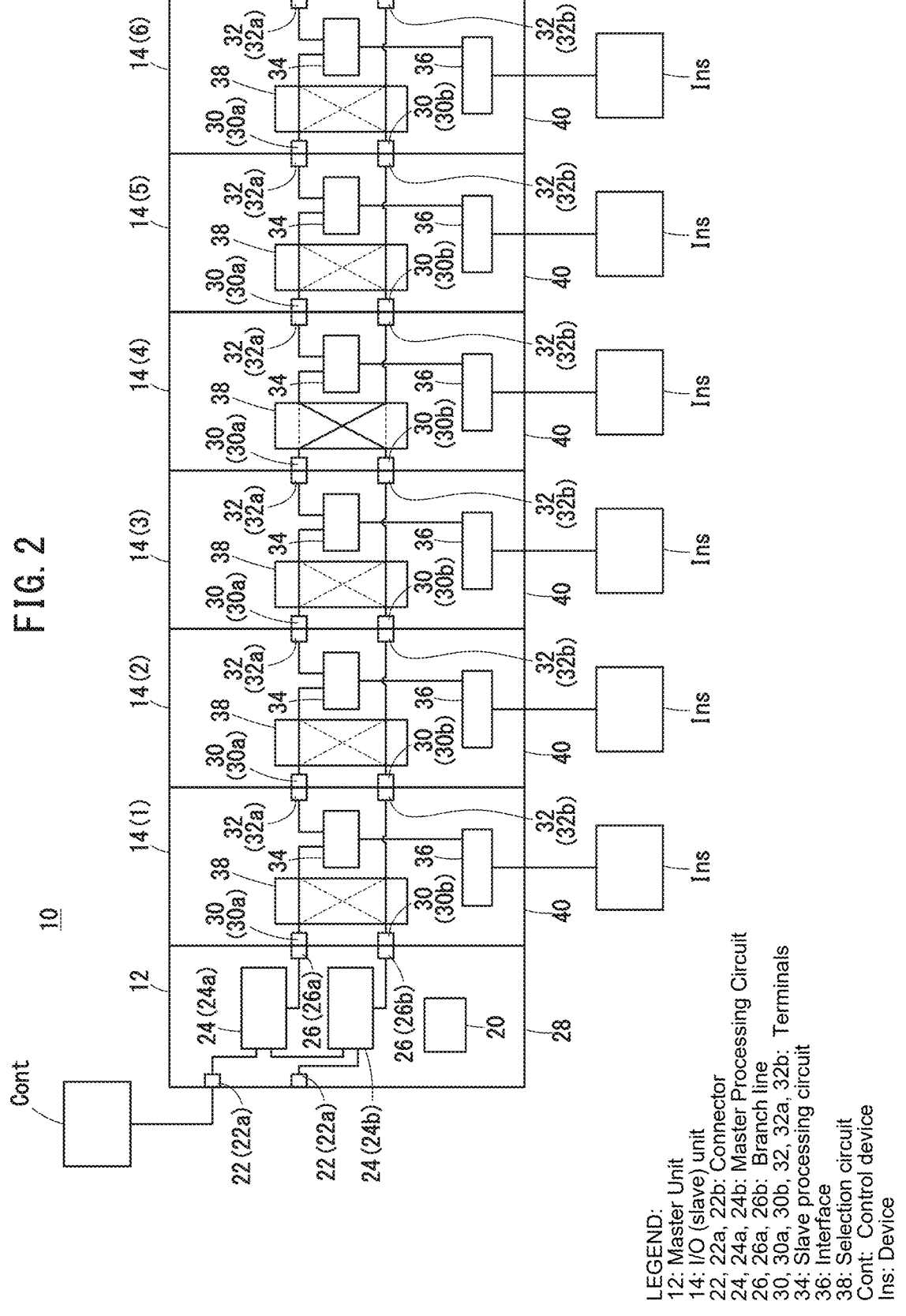
FIG. 2 is an example illustrating a connection state between two master processing circuits of a communication coupler unit and slave processing circuits of a plurality of I/O units.

FIG. 2 is an example illustrating a connection state between the two master processing circuits 24 (24*a* and 24*b*) of the communication coupler unit 12 and the slave processing circuits 34 of the plurality of I/O units 14. In the example of FIG. 2, in each of the I/O unit 14(1), the I/O unit 14(2), the I/O unit 14(3), the I/O unit 14(5), and the I/O unit 14(6), the two preceding-stage terminals 30 and the two subsequent-stage terminals 32 are connected based on the first connection relationship. Further, in the example of FIG. 2, in the I/O unit 14(4), the two preceding-stage terminals 30 and the two subsequent-stage terminals 32 are connected based on the second connection relationship. Each of the selection circuits 38 shown in FIG. 2 includes a solid line and a broken line. The preceding-stage terminal 30 and the subsequent-stage terminal 32 connected by a solid line indicate being connected to each other. The preceding-stage terminal 30 and the subsequent-stage terminal 32 connected by a broken line indicate not being connected to each other.

In the example of FIG. 2, the slave processing circuits 34 of the I/O unit 14(1), the I/O unit 14(2), and the I/O unit 14(3) are included in the first branch path. The I/O unit 14(1), the I/O unit 14(2), and the I/O unit 14(3) are daisy-chain connected to the master processing circuit 24*a* in this order. Also, the slave processing circuits 34 of the I/O unit 14(4), the I/O unit 14(5), and the I/O unit 14(6) are included in the second branch path. The I/O unit 14(4), the I/O unit 14(5), and the I/O unit 14(6) are daisy-chain connected to the master processing circuit 24*b* in this order. The I/O unit 14 of FIG. 1 can be easily added to a station.

Figure 4:
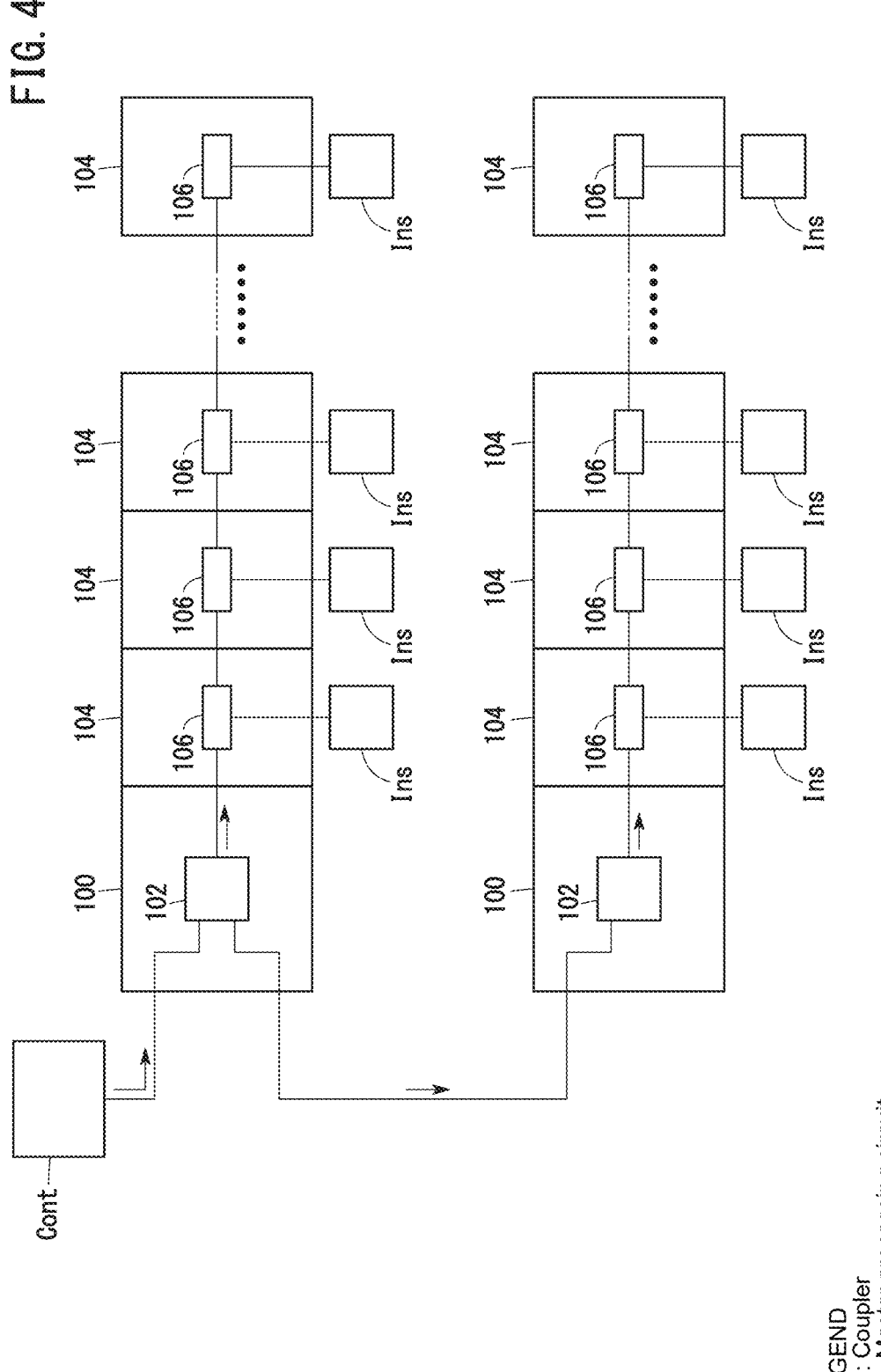
FIG. 4 illustrates a conventional communication system.

Here, a conventional technique will be described for comparison with the present embodiment. FIG. 4 shows a configuration example of a conventional communication system. The conventional communication system includes a communication coupler unit 100 and a plurality of I/O units 104 (see FIG. 4). The communication coupler unit 100 includes one master processing circuit 102. The I/O unit 104 includes one slave processing circuit 106. A plurality of slave processing circuits 106 are daisy-chain connected to one master processing circuit 102. The communication coupler unit 100 is connected to the control device Cont. One communication coupler unit 100 and a plurality of I/O units 104 connected to the one communication coupler unit 100 constitute one station. In FIG. 4, illustration of an interface connecting the slave processing circuit 106 and the device Ins is omitted.

For reasons such as the performance of the master processing circuit 102, there is an upper limit to the number of I/O units 104 that can be connected to one communication coupler unit 100. Therefore, when the number of I/O units 104 included in the conventional communication system exceeds the upper limit, the operator has to add another station. In this case, the operator has to prepare a plurality of communication coupler units 100. In addition, the operator has to connect a plurality of communication coupler units 100 to the control device Cont in a daisy chain fashion. The addition of the stations including these tasks imposes a heavy burden on the operator. For the above reasons, conventional communication systems are inconvenient for operators. In contrast to this conventional communication system, the communication system 10 of the present embodiment includes the I/O unit 14. The I/O unit 14 eliminates the need for an operator to add additional stations. This effect can also be obtained in the connection state of FIG. 3 described later.

Figure 3:
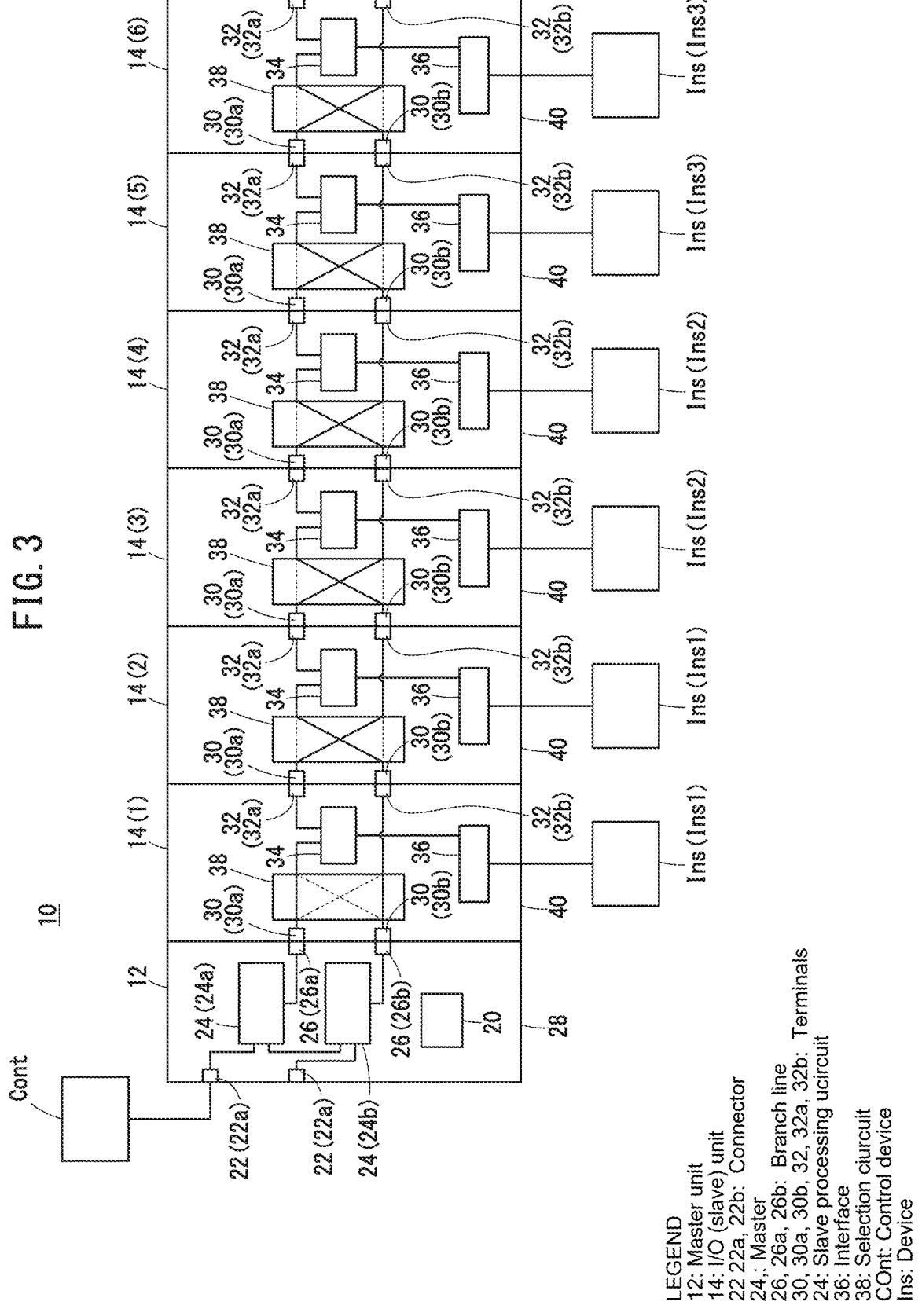
FIG. 3 is another example illustrating a connection state between two master processing circuits of a communication coupler unit and slave processing circuits of a plurality of I/O units.

FIG. 3 is another example illustrating a connection state between the two master processing circuits 24 (24*a* and 24*b*) of the communication coupler unit 12 and the slave processing circuits 34 of the plurality of I/O units 14. In the example of FIG. 3, for the I/O unit 14(1), the two preceding-stage terminals 30 and the two subsequent-stage terminals 32 are connected based on the first connection relationship. Further, in the example of FIG. 3, for each of the I/O unit 14(2), the I/O unit 14(3), the I/O unit 14(4), the I/O unit 14(5), and the I/O unit 14(6), the two preceding-stage terminals 30 and the two subsequent-stage terminals 32 are connected based on the second connection relationship.

Therefore, in the example of FIG. 3, the slave processing circuits 34 of the I/O unit 14(1), the I/O unit 14(3), and the I/O unit 14(5) are included in the first branch path. The I/O unit 14(1), the I/O unit 14(3), and the I/O unit 14(5) are daisy-chain connected to the master processing circuit 24*a* in this order. Also, in the example of FIG. 3, the slave processing circuits 34 of the I/O unit 14(2), the I/O unit 14(4), and the I/O unit 14(6) are included in the second branch path. The I/O unit 14(2), the I/O unit 14(4), and the I/O unit 14(6) are daisy-chain connected to the master processing circuit 24*b* in this order. Each of the selection circuits 38 shown in FIG. 3 includes a solid line and a broken line. The preceding-stage terminal 30 and the subsequent-stage terminal 32 connected by a solid line indicate being connected to each other. The preceding-stage terminal 30 and the subsequent-stage terminal 32 connected by a broken line indicate not being connected to each other.

Here, the devices Ins related to safety are often made redundant. The device Ins provided in a machine such as a machine tool or a robot and related to the operation of the machine is made redundant for safety. For example, a device (detector or the like) Ins that detects an operation of an emergency stop button for stopping a machine is made redundant. That is, two devices Ins related to safety are prepared.

In this case, according to the conventional technique, the operator sets up two stations (see FIG. 4). The operator connects one device Ins of the two redundant devices Ins of the same type to the I/O unit 104 of one station. In addition, the operator connects the other redundant device Ins to the I/O unit 104 of the other station. In this case, the two redundant devices Ins of the same type are connected respectively to the I/O units 104 that are located at the same stage from the respective communication coupler units 100 serving as their own master units. The connection between the I/O unit 104 and the device Ins is generally performed via wiring such as a cable. The I/O units 104 to which the two redundant devices Ins of the same type are respectively connected belong to different stations. Therefore, the I/O units 104 to which the two redundant devices Ins of the same type are respectively connected tend to be installed at positions relatively distant from each other. Here, there is a possibility that the operator may erroneously connect the redundant device Ins to another I/O unit 104 that is different from the I/O unit 104 to which each of the two redundant devices Ins of the same type is to be connected. In addition, since there are a plurality of devices Ins to be made redundant, the probability of occurrence of the above-described erroneous connection further increases.

In contrast to the conventional technology described above, in the present embodiment, the I/O units 14 that are to be connected respectively to the two redundant devices Ins of the same type are installed next to each other (see FIG. 3). Therefore, occurrence of the erroneous connection is prevented. That is, the operator can reliably connect two redundant devices Ins of the same type and the I/O units 14 to be connected to the two devices Ins.

A plurality of devices Ins are shown in FIG. 3. The plurality of devices Ins include a device Ins1, a device Ins2, and a device Ins3. Each of the device Ins1, the device Ins2, and the device Ins3 is made redundant. Therefore, two devices Ins1, two devices Ins2, and two devices Ins3 are prepared (see FIG. 3). One of the two devices Ins1 is connected to the I/O unit 14(1). The other of the two devices Ins1 is connected to the I/O unit 14(2). One of the two devices Ins2 is connected to the I/O unit 14(3). The other of the two devices Ins2 is connected to the I/O unit 14(4). One of the two devices Ins3 is connected to the I/O unit 14(5). The other of the two devices Ins3 is connected to the I/O unit 14(6). In this way, the two redundant devices Ins of the same type are connected respectively to the two I/O units 14 adjacent to each other. Therefore, the two redundant devices Ins of the same type can be prevented from being connected to other I/O units 14 different from the connection targets of the two devices Ins.

Note that the two redundant devices Ins of the same type refer to, for example, sensors whose detection targets are the same, actuators that operate the same target, actuators that perform the same role, or the like.

As will be explained briefly below, the control device Cont and the device Ins transmit signals via the communication system 10.

When the control device Cont transmits a control signal to the device Ins, the control device Cont outputs the control signal to the master processing circuit 24 (24a) of the communication coupler unit 12 connected to the first stage (first). The control signal includes address information etc.

of the I/O unit 14 to which the device Ins as a transmission target is connected. The master processing circuit 24 determines whether or not the address information included in the input control signal indicates the I/O unit 14 in the station to which the master processing circuit 24 itself belongs. Here, when the address information does not indicate the I/O unit 14 in the station to which the master processing circuit 24 itself belongs, the master processing circuit 24 outputs the control signal to a next master processing circuit 24 that is located in the subsequent stage. On the other hand, when the address information indicates the I/O unit 14 in the station to which the master processing circuit 24 itself belongs, the master processing circuit 24 outputs the control signal to the slave processing circuit 34 of the I/O unit 14(1) of the station. The slave processing circuit 34 determines whether or not the address information included in the input control signal indicates the slave processing circuit itself. Here, when the address information indicates itself, the slave processing circuit 34 outputs the control signal to the device Ins connected to the slave processing circuit itself. Thus, the device Ins is caused to operate. On the other hand, when the address information does not indicate the slave processing circuit 34 itself, the slave processing circuit 34 outputs the control signal to a slave processing circuit 34 of a next I/O unit 14 connected in the subsequent stage. When the address information included in the control signal indicates the slave processing circuit 34 itself, the slave processing circuit 34 may output the control signal to the next slave processing circuit 34 (the next I/O unit 14) in the subsequent stage if necessary. In addition, in a case where the address information included in the control signal indicates the I/O unit 14 in its own station, the master processing circuit 24 may output the control signal to the next master processing circuit 24 in the subsequent stage if necessary.

There is a case where the device Ins outputs a signal to the slave processing circuit 34 connected to the device Ins itself. In this case, the slave processing circuit 34 adds address information to the signal input from the device Ins. This address information indicates the master processing circuit 24 or the control device Cont. The slave processing circuit 34 outputs the signal to which the address information is added, to the slave processing circuit 34 connected to the preceding stage or the master processing circuit 24 connected to the preceding stage. The input and output of signals between the communication coupler unit 12 and the I/O unit 14 is a well-known technique and thus further description thereof is omitted.

Modification 1

The subsequent-stage terminal 32a in the above embodiment is connected to the selection circuit 38 via the slave processing circuit 34. On the other hand, the subsequent-stage terminal 32b is connected to the selection circuit 38 not via the slave processing circuit 34. However, the subsequent-stage terminal 32a may be connected to the selection circuit 38 not via the slave processing circuit 34. In this case, the subsequent-stage terminal 32b may be connected to the selection circuit 38 via the slave processing circuit 34. Also in this case, effects similar to those of the above-described embodiment can be obtained. In short, any one of the subsequent-stage terminals 32a and 32b only has to be connected to the selection circuit 38 via the slave processing circuit 34.

Modification 2

In the above-described embodiment and Modification 1, the slave processing circuit 34 is disposed between the selection circuit 38 and the subsequent-stage terminal 32. However, the slave processing circuit 34 may be disposed between the selection circuit 38 and the preceding-stage terminal 30. That is, the preceding-stage terminal 30*a* and the selection circuit 38 may be connected to each other via the slave processing circuit 34, and the preceding-stage terminal 30*b* and the selection circuit 38 may be connected to each other not via the slave processing circuit 34. Alternatively, the preceding-stage terminal 30*a* and the selection circuit 38 may be connected to each other not via the slave processing circuit 34, and the preceding-stage terminal 30*b* and the selection circuit 38 may be connected to each other via the slave processing circuit 34. Also in this case, effects similar to those of the above-described embodiment can be obtained. In short, any one of the preceding-stage terminals 30*a* and 30*b* only has to be connected to the selection circuit 38 via the slave processing circuit 34.

Modification 3

The communication coupler unit 12 according to the embodiment, the first modification, and the second modification includes the two master processing circuits 24. However, the communication coupler unit 12 may include three or more master processing circuits 24. In this case, the number of the preceding-stage terminals 30 and the number of the subsequent-stage terminals 32 are each the same as the number of the master processing circuits 24. In this case, the selection circuit 38 may select a preceding-stage terminal 30 and a subsequent-stage terminal 32 that are to be connected via the slave processing circuit 34, from the plurality of preceding-stage terminals 30 and the plurality of subsequent-stage terminals 32, respectively.

Modified Embodiments

Although the embodiment and the modifications of the present invention have been described above, the present invention is not limited to the above-described embodiment and modifications, and various modifications can be made thereto within a range that does not depart from the essence and gist of the present invention.

Invention Obtained from Embodiments

The invention that can be grasped from the above-described embodiment and modifications will be described below.

The I/O unit (14) connects the master unit (12) and the device (Ins) and transmits a signal between the master unit (12) and the device (Ins). The I/O unit (14) includes: the first preceding-stage terminal (30*a*) and the second preceding-stage terminal (30*b*) configured to be connected to the master unit (12) or another I/O unit (14) provided in a preceding stage of the I/O unit; the first subsequent-stage terminal (32*a*) and the second subsequent-stage terminal (32*b*) configured to be connected to another I/O unit (14) provided in a subsequent stage of the I/O unit; the selection circuit (38) configured to select between a connection state in which the first preceding-stage terminal (30*a*) is connected to the first subsequent-stage terminal (32*a*) and the second preceding-stage terminal (30*b*) is connected to the second subsequent-stage terminal (32*b*) and a connection state in which the first preceding-stage terminal (30*a*) is connected to the second subsequent-stage terminal (32*b*) and the second preceding-stage terminal (30*b*) is connected to the first subsequent-stage terminal (32*a*); and the slave processing circuit (34) configured to perform input and output of a signal with respect to a master processing circuit (24) of the master unit (12). One of the first preceding-stage terminal (30*a*) or the second preceding-stage terminal (30*b*) or one of the first subsequent-stage terminal (32*a*) or the second subsequent-stage terminal (32*b*) is connected to the selection circuit (38) via the slave processing circuit (34).

With this configuration, even when the number of slave processing circuits (34) of the I/O unit (14) is one, the number of master processing circuits (24) of the communication coupler unit (12) is two, the communication coupler unit (12) and the plurality of I/O units (14) are adjacent to each other, and the terminals thereof are connected to each other without a cable or the like, the plurality of slave processing circuits (34) can be connected to each of the two master processing circuits (24*a*, 24*b*).

In addition, since the selection circuit (38) is provided, there is no need to separately prepare a dedicated I/O unit for the master processing circuit (24*a*), i.e., in which its slave processing circuit (34) is connected to the master processing circuit (24*a*), and a dedicated I/O unit for the master processing circuit (24*b*), i.e., in which its slave processing circuit (34) is connected to the master processing circuit (24*b*). In other words, the I/O unit whose slave processing circuit (34) is connected to the master processing circuit (24*a*) and the I/O unit whose slave processing circuit (34) is connected to the master processing circuit (24*b*) can be integrated into a single I/O unit (14).

The master unit (12) includes the two master processing circuits (24*a*, 24*b*), and the slave processing circuit (34) performs input and output of a signal with respect to one of the two master processing circuits.

The invention claimed is:

1. An I/O unit that connects a master unit and a device and transmits a signal between the master unit and the device, wherein the master unit includes a first master processing circuit and a second master processing circuit, the I/O unit comprising:

a first preceding-stage terminal and a second preceding-stage terminal configured to be connected to the master unit or another I/O unit provided in a preceding stage of the I/O unit;

a first subsequent-stage terminal and a second subsequent-stage terminal configured to be connected to another I/O unit provided in a subsequent stage of the I/O unit;

a switching element configured to be operated by an operator;

a selection circuit configured to switch, in response to an operation of the switching element by the operator, between a first connection state in which the first master processing circuit is connected to the first subsequent-stage terminal via the first preceding-stage terminal and the second master processing circuit is connected to the second subsequent-stage terminal via the second preceding-stage terminal and a second connection state in which the first master processing circuit is connected to the second subsequent-stage terminal via the first preceding-stage terminal and the second master processing circuit is connected to the first subsequent-stage terminal via the second preceding-stage terminal; and a slave processing circuit configured to perform input and output of a signal with respect to the first master processing circuit or the second master processing circuit, wherein one of the first preceding-stage terminal or the second preceding-stage terminal or one of the first subsequent-stage terminal or the second subsequent-stage terminal is connected to the selection circuit via the slave processing circuit, the first master processing circuit and the second master processing circuit are connected in parallel via the first preceding-stage terminal and the second preceding-stage terminal.

* * * * *